Aug. 21, 1962   W. V. KENZIK ETAL   3,050,157
AUTOMATIC BRAKE ADJUSTER
Filed Aug. 3, 1961   2 Sheets-Sheet 1

INVENTORS
William V. Kenzik
Wilbur J. Oakley
BY
Their Attorney

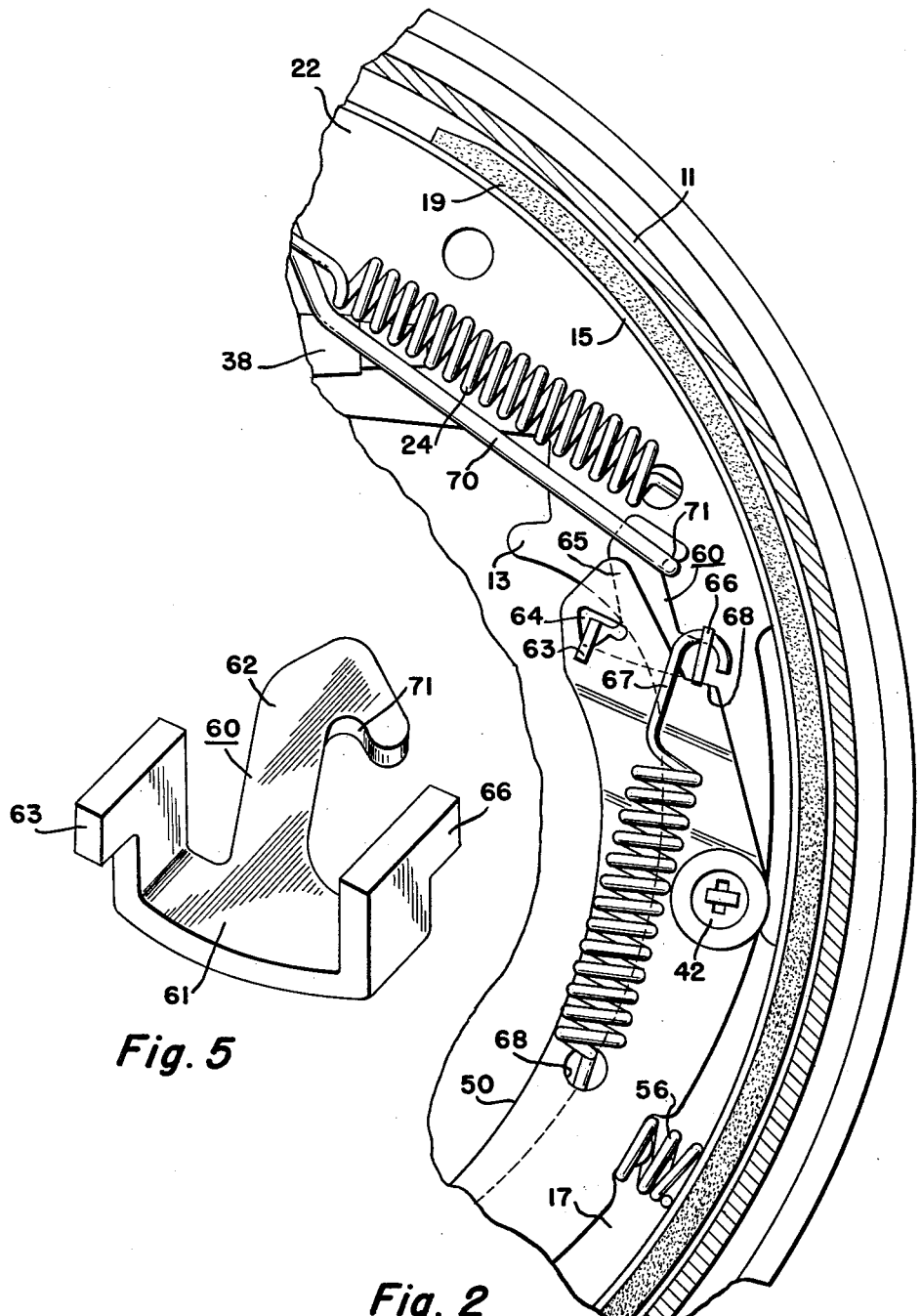

United States Patent Office 3,050,157
Patented Aug. 21, 1962

3,050,157
AUTOMATIC BRAKE ADJUSTER
William V. Kenzik and Wilbur J. Oakley, Dayton, Ohio, assignors to General Motors Corporation, Detroit, Mich., a corporation of Delaware
Filed Aug. 3, 1961, Ser. No. 129,002
7 Claims. (Cl. 188—79.5)

This invention relates to an automatic adjuster for drum type brakes to maintain the brake shoes in a predetermined clearance condition relative to the brake drum to compensate for wear of the linings on the brake shoes.

An object of the invention is to provide an automatic adjuster for drum type brakes utilizing arcuate shoes that are responsive to wear of the lining on the brake shoes and which can be installed at a nominal cost on standard production brake shoes.

In a brake utilizing an adjusting strut which adjusts the clearance between the brake shoe and the drum, there are times during brake application that the thrust load on the adjusting strut is so high that the strut cannot be extended by the adjusting device for the same so that any automatic adjusting mechanism that is connected with the adjusting strut is prevented from normal operation. Under this condition excessively high loads are carried in the automatic adjusting mechanism which tend to break or bend parts of the mechanism so that it thereafter malfunctions.

An object of this invention is to provide an automatic brake adjusting mechanism adapted for operating the adjusting strut of a brake to compensate for wear of the lining on the brake shoes which includes a mechanism which relieves excessively high loads from the automatic adjusting mechanism during times of abnormal brake application.

The foregoing object of the invention is accomplished by placing a resilient link connection between the adjusting lever of the automatic brake adjusting mechanism and a fixed point in the brake so that when the brake shoe moves and the adjusting lever of the automatic brake adjusting mechanism is prevented from normal movement by high thrust loads on the adjusting strut, the resilient link mechanism will absorb the movement of the brake shoe and thereby relieve the automatic adjusting mechanism of excessively high loads.

Further objects and advantages of the present invention will be apparent from the following description, reference being had to the accompanying drawings wherein preferred embodiments of the present invention are clearly shown.

In the drawings:

FIGURE 2 is an enlarged view of a part of the brake illustrated in FIGURE 1 illustrating the relief mechanism of the automatic brake adjusting device.

FIGURE 5 is a perspective elevational view of the secondary lever carried on the primary lever of the adjusting mechanism.

Figure 1:
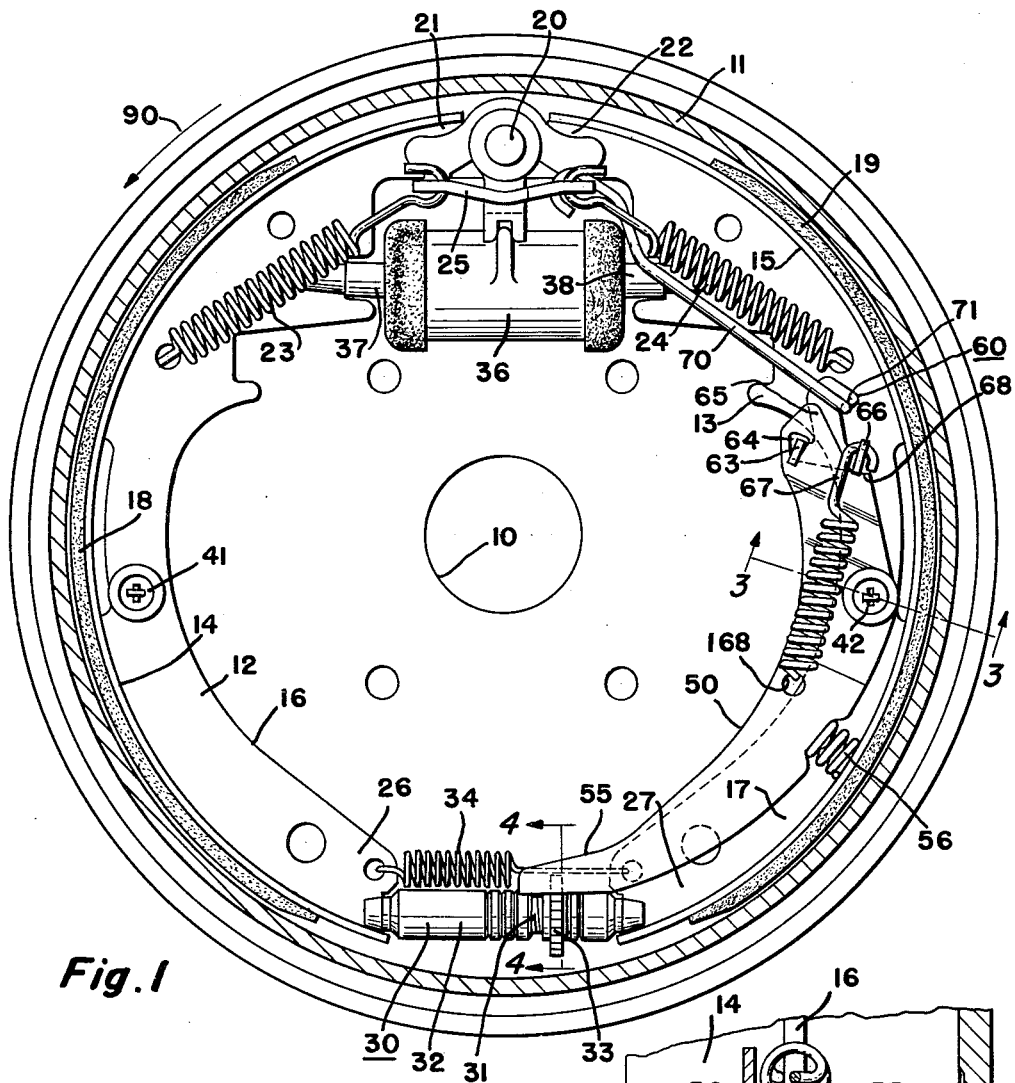
FIGURE 1 is a cross-sectional view of a brake mechanism incorporating features of this invention.

The brake of this invention consists of a backing plate 10 that is a stationary member and is adapted to be secured to an axle housing or axle spindle of a motor vehicle. A brake drum 11 is adapted to be carried by a wheel of the vehicle.

Brake shoes 12 and 13 are supported on the backing plate 10 by the axially extending rim portions 14 and 15, respectively, being supported on suitable raised support pad portions on the backing plate 10 in conventional manner. Each of the brake shoes 12 and 13 has its respective rim portions 14 and 15 provided with central radial webs 16 and 17, respectively, so that the brake shoe structure is in the form of a T-shaped element having a generally arcuate contour for placement within the brake drum 11.

The brake shoe 12 has a brake lining element 18 while the brake shoe 13 has a corresponding brake lining element 19.

An anchor pin 20 is secured to the backing plate 10 and is engaged by cooperating adjacent ends 21 and 22 of the brake shoes 12 and 13, respectively, retraction springs 23 and 24 secured between the respective brake shoes and a bracket 25 positioned on the anchor pin 20 hold the ends 21 and 22 of the brake shoes in engagement with the anchor pin 20.

The opposite adjacent ends 26 and 27 of the respective brake shoes 12 and 13 engage an adjusting strut 30 that has a threaded member 31 threadedly received by the cylindrical member 32 so that rotation of the adjusting wheel 33 will effect extension of the adjusting strut 30. An extension spring 34 secured at opposite ends to the end portions 26 and 27 of the respective brake shoes retain the ends of the brake shoes in engagement with opposite ends of the adjusting strut 30.

The adjusting wheel 33 has its periphery provided with a series of serrations 35 adapted for engagement by an adjusting mechanism hereinafter described or by means of a tool in the hands of a workman for manual adjustment of the brake shoes relative to the brake drum.

A hydraulic wheel cylinder 36 receiving hydraulic fluid under pressure from a master cylinder, not shown, is provided with plunger members 37 and 38 that engage the webs of the brake shoes 12 and 13, respectively, to urge the brake shoes into engagement with the brake drum when hydraulic fluid under pressure is delivered from the master cylinder into the wheel cylinder 36.

The brake shoes 12 and 13 are retained on the guide support pads provided on the backing plate 10 by means of hold down springs 41 and 42 in conventional manner.

Figure 3:
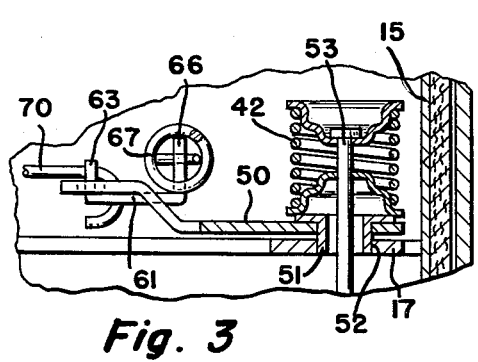
FIGURE 3 is a cross-sectional view taken along line 3—3 of FIGURE 1 illustrating the pivot connection to a brake shoe for the adjusting lever.
Figure 4:
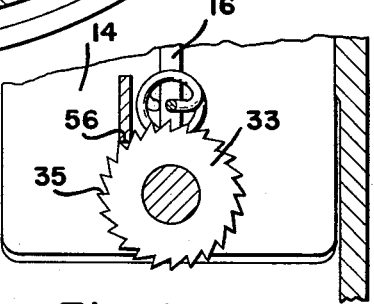
FIGURE 4 is a cross-sectional view taken along line 4—4 of FIGURE 1 illustrating the adjusting strut for the brake.

To effect automatic adjustment of the extensible strut 30 by rotation of the wheel 33, a first lever 50 is rotatably mounted on the web 17 of the brake shoe 13 by means of the hold down spring arrangement 42. As shown in FIGURE 3, the lever 50 has a bearing bushing 51 positioned in an opening 52 in the web 17 on which the lever 50 is pivotally rotatable, the bushing being retained in position by the hold down spring 42 which includes the pin member 53 that extends into engagement with the backing plate 10 in conventional manner. The lever 50 has one end portion 55 thereof arranged in the form of a detent 56 that is engageable with the serrations 35 in the wheel 33 to effect rotation of the wheel 33 when the lower end 55 of the lever rotates in a counterclockwise direction about the mounting pivot for the same. The compression spring 56 normally holds the lever 50 in the position shown, the spring being between the lever 50 and the rim 15 of the brake shoe 13.

The upper end of the lever 50 carries a second lever member 60 pivotally rotatable on the same.

The lever 60 is in the general form of a T-shaped member having a head portion 61 and a stem portion 62. One end of the head portion 61 of the lever carries an ear 63 that is inserted through the opening 64 in the upper end portion 65 of the lever 50 and on which the lever pivots for rotation on the ear 63 as it is positioned in the opening 64.

The opposite end of the head portion 61 of the lever 60 has an ear 66 engaged by one end of a tension spring 67 which has the opposite end thereof hooked into a hole 168 in the lever 50 so that normally the ear 66 is pulled down against a fixed stop 68 and thereby retain the lever 60 in a predetermined position relative to the lever 50 so that both levers 50 and 60 function as a single lever under normal braking conditions.

A rigid wire link member 70 has one end thereof engaging the hook 71 of the stem portion 62 of the lever 60 with the opposite end being hooked into an opening in the bracket 25 that is a part of the anchor arrangement for the brakes.

The arrangement of the automatic adjusting mechanism is such that when the lever 50 is prevented from rotation about its pivot for any reason, and a brake application is made which causes the brake shoe 13 to move clockwise away from the anchor 20, the secondary lever 60 will rotate on the pivot ear 63, lifting ear 66 from the stop 68 against the action of the spring 67 to thereby relieve excessive forces from the lever 50.

In normal operation of the device, the drum 11 rotates in the direction of the arrow 90 as the vehicle moves forward. Thus, on an application of the brakes, the wheel cylinder 36 expands the brake shoes 12 and 13 into engagement with the brake drum 11 to effect counter-clockwise rotation of the brake shoe assembly with the end portion 22 of the brake shoe 13 engaging the anchor 20. This is the normal operation of a servo brake mechanism. On reverse motion of the vehicle the wheel cylinder will again expand the brake shoes 12 and 13 into engagement with the brake drum but at this time, the the brake assembly will rotate in a clockwise direction relative to the anchor 20 so that the link 70 pulling on lever 60 will cause lever 50 to rotate about its pivot 52 and effect a counterclockwise movement of the end portion 55 of the lever and rotate the wheel 33 to effect an extensible adjustment of the adjusting strut 30 whenever the wear of the brake linings is greater than the peripheral spacing between adjacent teeth of the serrations on wheel 33.

However, there are times when a heavy brake action is occasioned when the brake assembly is rotated in the clockwise direction, as is normal on a reverse movement of the vehicle. The heavy brake action on the braking structure will produce a high axial thrust on the adjusting strut that is sufficient to prevent the threaded portion 31 turning in the cylinder portion 32, thereby holding the wheel 33 stationary. This condition prevents the lever 50 from rotating in its normal manner so that if the rigid link 70 were connected directly to the upper end of the lever 50, exceptionally high stresses would be applied to the lever 50 which would either break the lever or overstress the parts to such an extent that they would subsequently malfunction.

However, under this condition, that is with the wheel 33 being prevented from rotation by the high axial thrust load on the adjusting strut 30, the lever 60 will rotate on its pivot ear 63 when the brake assembly rotates in a clockwise direction with the lever 60 working against the action of the spring 67 between the lever and the web of the brake shoe so that the stress is relieved from the lever 50, the lever 60 thereby acting as an unloading or stress relieving device.

Under normal conditions of operation, the spring 67 between the lever 60 and the web of the brake shoe 13 is of sufficient strength to retain the ear 66 against the fixed stop on the lever 50 so that levers 50 and 60 function as a unitary element. It is only when lever 50 is prevented from rotation on its pivot 42 that lever 60 will rotate on its pivot ear against the action of the retaining spring to relieve the stress on the lever 50.

While the embodiments of the present invention as herein disclosed constitute preferred forms, it is to be understood that other forms might be adopted.

What is claimed is as follows:

1. In a brake having a primary shoe and a secondary shoe, an automatic adjuster to maintain a predetermined brake shoe clearance in accordance with wear of the shoes, including, an extendible strut between the shoes including a rotatable wheel to extend the strut on rotation of the wheel, a first lever rotatably mounted on one of said shoes having one end engageable with said wheel to rotate the wheel on rotation of said lever, a second lever rotatably mounted on the opposite end of said first lever, spring means connected for operative reaction on said first lever and engaging said second lever holding the same resiliently in a predetermined position relative to said first lever, and a link between a fixed member of the brake and said second lever to effect rotation of said first lever thereby on movement of said one shoe and thereby effect rotation of said wheel to extend said strut.

2. A brake constructed and arranged in accordance with the structure set forth in claim 1 which includes spring means between said first lever and a fixed member of the brake holding said one end of said first lever resiliently in a predetermined position relative to said wheel.

3. A brake constructed and arranged according to the structure set forth in claim 2 in which said first-mentioned spring is positioned between said first lever and said second lever and said second-mentioned spring is positioned between said first lever and said one shoe.

4. In a brake having a primary shoe and a secondary shoe, an automatic adjuster to maintain a predetermined brake shoe clearance in accordance with wear of the shoes, including, an extendible strut between the shoes including a rotatable wheel to extend the strut on rotation of the wheel, a first lever rotatably mounted on one of said shoes having one end engageable with said wheel to rotate the wheel on rotation of said lever, a second lever rotatably mounted on the opposite end of said first lever, spring means connected to said first lever for reaction thereon and engaging said second lever holding the same resiliently in a predetermined position relative to said first lever, a link between a fixed member of the brake and said second lever to effect rotation of said first lever thereby on movement of said one shoe and thereby effect rotation of said wheel to extend said strut, said second lever being rotatable on said first lever against the action of said spring means when said first lever is held against rotation on movement of said one shoe.

5. In a brake having a primary shoe and a secondary shoe, an automatic adjuster to maintain a predetermined brake shoe clearance in accordance with wear of the shoes, including, an extendible strut between the shoes including a rotatable wheel to extend the strut on rotation of the wheel, a first lever rotatably mounted on one of said shoes having one end engageable with said wheel to rotate the wheel on rotation of said lever, a second lever rotatably mounted on the opposite end of said first lever, spring means connected for operative reaction on said first lever and engaging one end of said second lever holding the same resiliently against fixed stop means on said first lever to position thereby said second lever in a predetermined position relative to said first lever, and a link between a fixed member of the brakes and the opposite end of said second lever to effect rotation of said first lever thereby on movement of said one shoe and thereby effect rotation of said wheel to extend said strut, said spring normally holding said second lever in a fixed relation relative to said first lever during movement of said one shoe and providing for rotation of said second lever relative to said first lever when said first lever is held against rotation during movement of said one shoe.

6. In a brake having two arcuate brake shoes each operatively connected to a fixed anchor at one end, an automatic adjuster for said shoes comprising an extendible member interconnecting the unanchored ends of said brake shoes including a rotary wheel having a serrated periphery to effect extension of said extendible member on rotation of said wheel, a first lever rotatably mounted on one of said shoes and having a detent at one end thereof engageable with the serrated periphery of said wheel to effect rotation thereof on rotation of said first lever, a second lever rotatably mounted on the opposite end of said first lever, spring means having operative reaction connection with said first lever and engaging one end of said second lever resiliently holding said second lever against fixed stop means on said first lever to position said second lever in a predetermined position relative to said first lever, and a rigid link member extending between the opposite end of said second lever and said fixed anchor whereby to effect rotation of said first lever on movement of said one shoe relative to said fixed anchor, said spring means providing for rotation of said second lever relative to said first lever when said first lever is held against rotation during movement of said one shoe relative to said fixed anchor.

7. In a brake having articulated brake shoes each operatively connected to a fixed anchor at one end, an automatic adjuster for said shoes comprising an extendible member interconnecting the unanchored ends of said brake shoes including a rotary wheel having a serrated periphery to effect extension of said extendible member on rotation of said wheel, a first lever rotatably mounted on one of said shoes having one end provided with a detent engageable with the serrated periphery of said wheel to effect rotation thereof on rotation of said first lever relative to said one shoe, first spring means between said first lever and a fixed part of the brake normally to position said first lever in a position of disengagement of the detent thereof with the serrations on said wheel, a generally T-shaped second lever rotatably mounted on said first lever at one end of the head portion of the said second lever, second spring means engaging said first lever and the opposite end of the head portion of the said second lever holding the same resiliently against stop means on said first lever to place said second lever in a predetermined position relative to said first lever, and a rigid link member between the fixed anchor and the stem portion of the said second lever to effect rotation of said first lever thereby on movement of said one shoe relative to said anchor, said second spring means providing for rotation of said second lever relative to said first lever when said first lever is held against rotation during movement of said one shoe relative to said anchor.

References Cited in the file of this patent

UNITED STATES PATENTS

| | | |
|---|---|---|
| 2,060,429 | Smith | Nov. 10, 1936 |
| 2,762,463 | Brooks | Sept. 11, 1956 |
| 2,938,610 | Dombeck et al. | May 31, 1960 |